United States Patent [19]

Maxemchuk

[11] 4,375,083
[45] Feb. 22, 1983

[54] SIGNAL SEQUENCE EDITING METHOD AND APPARATUS WITH AUTOMATIC TIME FITTING OF EDITED SEGMENTS

[75] Inventor: Nicholas F. Maxemchuk, Mountainside, N.J.

[73] Assignee: Bell Telephone Laboratories, Incorporated, Murray Hill, N.J.

[21] Appl. No.: 117,104

[22] Filed: Jan. 31, 1980

[51] Int. Cl.³ ............................................. G11B 27/02
[52] U.S. Cl. .................................... 364/900; 360/13; 369/83
[58] Field of Search ... 364/200 MS File, 900 MS File; 360/13, 14, 27; 369/48, 83

[56] References Cited

U.S. PATENT DOCUMENTS

| | | | |
|---|---|---|---|
| 2,852,616 | 9/1958 | Glenn | 369/14 |
| 2,901,548 | 8/1959 | Sager | 360/7 |
| 3,287,503 | 11/1966 | Kling | 360/13 |
| 3,296,371 | 1/1967 | Fox | 179/1 |
| 3,418,432 | 12/1968 | Boggs, Jr. et al. | 369/29 |
| 3,723,667 | 3/1973 | Park, Jr. et al. | 369/50 |
| 3,916,121 | 10/1975 | Stuzzi | 369/27 |
| 4,021,649 | 5/1977 | Fort et al. | 364/736 |
| 4,040,024 | 8/1977 | Cowe et al. | 364/900 |

OTHER PUBLICATIONS

Nakatani, "Computer-Aided Signal Handling for Speech Research", *Journal of Acoustical Society of America*, vol. 61, No. 4, Apr. 1977, pp. 1056-1062.

Cornell et al, "A Centralized Approach to New Network Services," *Conference Record of the 1979 ICC*, Jun. 1979, pp. 3.3.1-3.3.7.

*Primary Examiner*—Raulfe B. Zache
*Attorney, Agent, or Firm*—C. S. Phelan

[57] ABSTRACT

A voice message from a user telephone (11) is recorded (FIG. 3) by being converted to digitally coded form and processed through a computer memory (32) prior to placement in bulk storage (31) memory sectors of uniform size. The message is retrieved in a playback operation (FIG. 4). Signal energy estimates for respective memory-sector-sized parts of the message are computed, stored, and used for various purposes including message playback speed control. User-originated command data messages to the computer cause editing of the message in accordance with the commands. To effect editing, the user directs the establishment of one or more pointers at selectable silent-sector points in the message, orders the computer to display the pointer relative positions, and orders a selectable editing operation with reference to at least one of the displayed pointers.

36 Claims, 13 Drawing Figures

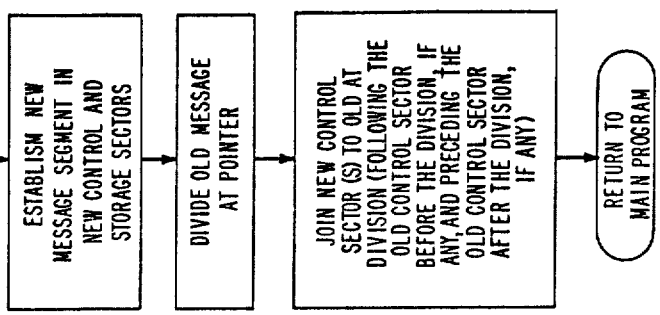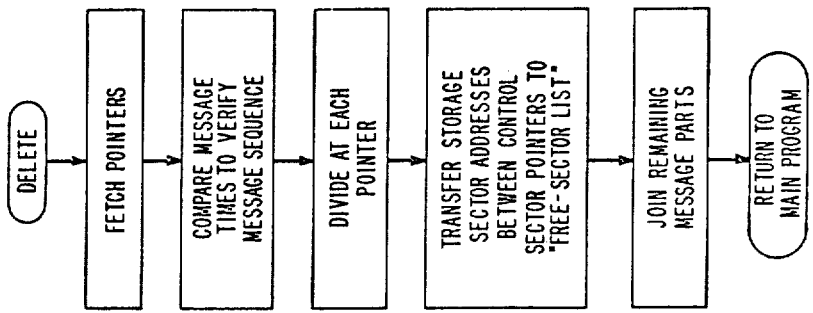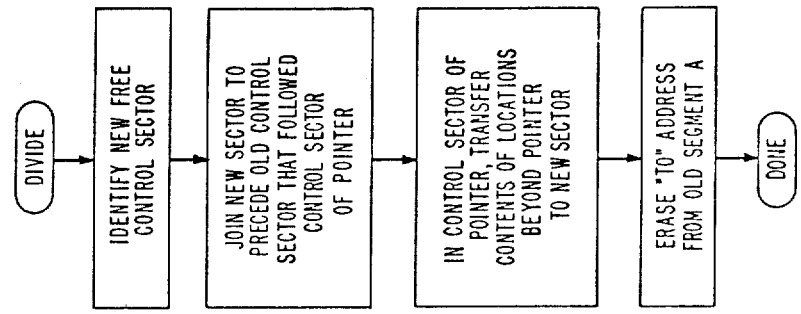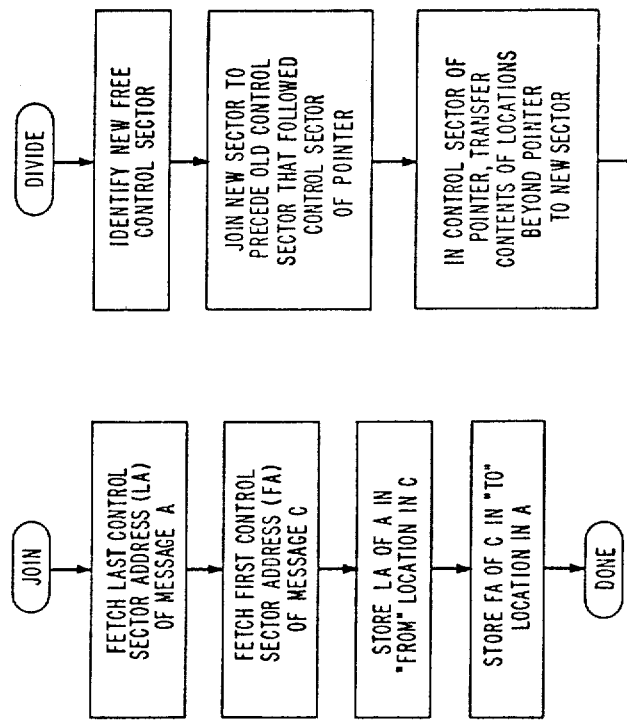

SIGNAL SEQUENCE EDITING METHOD AND APPARATUS WITH AUTOMATIC TIME FITTING OF EDITED SEGMENTS

TECHNICAL FIELD

This invention relates to the editing of recorded sound messages, and it relates, in particular, to an electronic system for user-control of such messages.

BACKGROUND OF THE INVENTION

Editing is commonly done in text oriented systems by reference to certain words, e.g., "delete all after word 'A' and before word 'B'." In sound oriented systems such as those dealing with voice messages, it is hard for a user to remember specific word locations; and there is no convenient way in the present state of the art to provide a display of the voice-entered message as an aid to the user. In one particular aspect, it is often difficult for a user to achieve a satisfactory time fit of edited signal segments.

The need for an editing capability for voice messages has long been evident in dictation equipment, magnetic sound recording equipment, and sound motion picture equipment. Efforts to meet that need have usually been limited to putting marks on the same, or an associated, record either so that a manual cut-and-splice operation can be done at a later time as taught, for example, in the G. R. Glenn U.S. Pat. No. 2,852,616, or so that a person later transcribing the message to text form will be warned where to expect changes as taught, for example, in the V. Stuzzi U.S. Pat. No. 3,916,121. One laboratory system is known to contemplate extraction of recorded message segments to construct separately a new segment sequence. This is taught by L. H. Nakatani in a paper entitled, "Computer-aided Signal Handling for Speech Research" and appearing in the *Journal of the Acoustical Society of America*, Vol. 61, No. 4, April, 1977, pp. 1056-1062. In that system, a skilled operator can observe an analog signal wave display of a sound recording, manually position cursors on the display to designate so-called "tokens" for removal, order the marking of cursor positions, and then order the tokens to be extracted and played back in a subsequently selected order. Although the system is useful for speech perception and synthesis research, it is not useful to the unskilled user for message editing.

SUMMARY OF THE INVENTION

The editing difficulties experienced in the prior art are eased somewhat by a recording and editing method in which the samples in a group of digitally coded signal samples are stored with a parameter that is a function of the information content of the group, and the parameter is used in group processing for different editing functions on readout.

In one embodiment of the present invention utilizing that method, a processor for a voice message storage system is operated to receive user commands to register pointers at particular spots in a voice message. The system is arranged to present in human-perceptible form indications of the relative positions in the message sequence of the pointers so registered. User-directed editing changes are then made in the message portion identified by one or more pointers specified by the user.

Brief Description of the Drawing

A more complete understanding of the invention and various features, objects and advantages thereof, may be obtained from a consideration of the following description in connection with the appended claims and the attached drawings in which

FIGS. 9-12 are diagrams of illustrative processes for operations of JOIN, DIVIDE, DELETE, and INSERT for use in one embodiment of the invention.

DETAILED DESCRIPTION

During the course of the following descriptions, the term "message" will be employed in different contexts which will be indicated by appropriate qualifying adjectives. Nevertheless, it should be pointed out that one of these forms, i.e., voice message, will be used to refer to a message provided in analog signal form and converted to a coded digital format for successive analog signal sample amplitudes for storage, i.e., recording. The digital format is advantageously that commonly designated as binary coded, $\mu 255$, pulse code. A second form is "text message," and it is employed to refer to character-oriented messages wherein alphanumeric characters are respectively represented by binary coded digital characters, or words, utilized either as data for equipment control or as a text message for storage as directed by a user.

The term "edit" is employed in the broad sense of revision. That is, it embraces adding and/or deleting information words, as well as changing the duration and character of pauses between words at selectable times for different purposes.

This invention is generally useful for editing digitally coded signal sequences. However, it will be here illustratively described in connection with a voice signal editing application.

Figure 1:
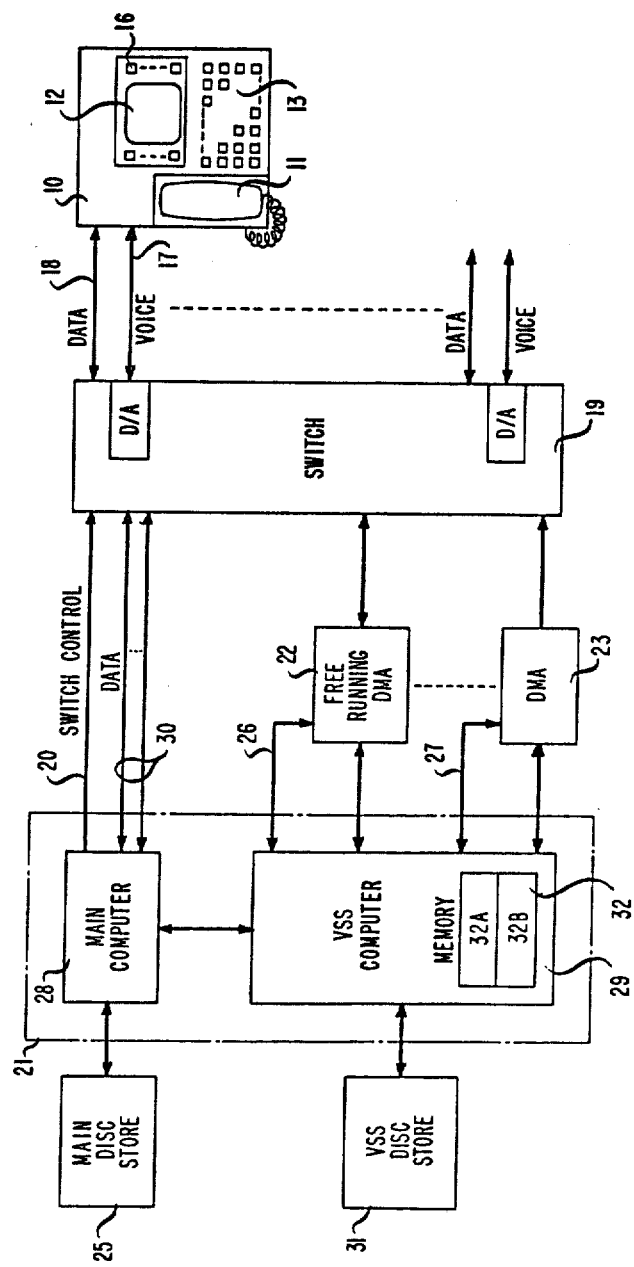
FIG. 1 is a block and line diagram of a voice storage system utilizing the invention.

In FIG. 1, a subscriber terminal 10 is advantageously employed to give a user both analog voice and data input/output to the illustrated voice storage system. This terminal is illustratively a general purpose electronic telephone station set in accordance with the co-pending U.S. patent application of R.V. Anderson et al., Ser. No. 53,099, filed on June 28, 1979, entitled "General-Purpose Electronic Telephone Station Set," and assigned to the same assignee as the present application. Alternatively, a separate telephone station set and video terminal can be employed for the voice and data parts of the terminal 10. That terminal includes a telephone handset 11 having the usual electromechanical analog transducers, a cathode ray tube screen 12, and a keyboard, such as the full ASCII keyboard 13, for permitting full alphanumeric text-type input. Also included are processing and logic circuits for coordinating operation of the other elements with each other and with a host computer. The screen 12 also has associated therewith along either side a column of push buttons, such as push button 16, which are available in the terminal 10 to be employed by the user for indicating to the system a selection of a corresponding line or part of the line of a display on the screen 12. A plurality of terminals 10 are advantageously employed, although only one such terminal is specifically illustrated.

Each of the terminals 10 is provided with a separate bidirectional voice circuit 17 and bidirectional data circuit 18 to an individual port on a switch 19.

Switch 19 is provided to permit a selectable coupling of different ones of the plurality of terminals into the illustrated voice storage system (VSS). The switch, as illustrated, schematically includes a line circuit per terminal voice circuit, and each line circuit includes a digital-to-analog converter. Such a line circuit is illustrated, for example, in the U.S. Pat. No. 4,007,334 of H. S. McDonald. The switch 19 is advantageously a digital switch, and one example of a suitable switch of that type is shown in the U.S. Pat. No. 4,112,258 of H. G. Alles.

Switch 19 is controlled by data signals coupled thereto by way of a control signal path schematically represented by a lead 20 extending from a system control processor 21. One such processor, to be specifically described, is capable of accommodating three of the terminals 10 for simultaneous voice storage with editing. Consequently, many more such terminals can be served by the control processor 21 on a time-shared basis.

Voice circuits 17, from the respective terminals 10 are coupled through the switch 19 and to memory in the processor 21 by way of direct memory access (DMA) circuits, such as the identical circuits 22 and 23, which are specifically illustrated in the drawing. The data circuits 18 from the respective terminals 10 are coupled through the switch 19 and circuits 30 to the control processor 21. Circuits 30 are equal in number to the DMA circuits, and they are, like the DMA circuits and circuits 17 and 18, capable of passing signals in either direction.

The DMA circuits 22 and 23 are advantageously the circuits DMA-L11 circuits of the Computer Technology Corporation, and such circuits are provided with respective connection 26 and 27 to the control processor 21 for the communication of clocking and control signals therebetween. DMA circuits usually include an address counter, that is clocked to define access addresses in fixed sequence, and a further memory area measuring counter that is preset in each cycle to define both the maximum number of memory locations and region in memory to be accessed. When the measuring counter gets to zero, the DMA stops and gives a corresponding output flag signal. The indicated commercial DMA circuits were of that type and were modified with respect to their counter connections, as hereinafter outlined, in order to facilitate operation of the DMA sufficiently rapidly to allow real time operation of the voice storage and editing arrangements described herein.

To this end, the DMA measuring counter is arranged to recycle automatically upon attaining a count corresponding to half of the desired memory area dedicated to that particular DMA for sample storage. Upon such recycling, the DMA provides a flag signal to the control processor 21. That flag signal causes an interrupt in the processor which tells the processor that it must now do something with that one-half area block of digitally coded samples, which had just been loaded from a user's terminal, while the DMA circuit begins loading the other half of its dedicated memory area from the same source. The address counter of the DMA is wired to begin its operation with the first address of the control processor memory area to which the DMA is assigned for sample storage and go to the assigned end of that area before recycling automatically. Logic from the two counters of the DMA generates signals along with the aforementioned interrupt information to inform the control processor 21 which half of the DMA dedicated memory should be processed at any given time. A similar mode of operation prevails for transferring samples from computer memory to a user terminal.

Although a single computer can be employed for the control processor 21, two related computers are advantageously employed in the illustrative embodiment to allow various services to be provided utilizing a main one of the two computers, represented by a main computer 28, without concern for real time requirements of processing signal samples for storage system purposes. This configuration also allows text services which are supported in the main computer to be merged with voice services. In the illustrative embodiment, a second computer, the VSS computer 29, and the associated DMA circuits 22 and 23 handle the manipulation and processing of voice samples which must be carried out on a routine, real time, periodic basis.

The main computer 28 has overall control of the system, including a disc store 25, computer 29, the data circuit coupling to switch 19 represented by the circuit 20, and the switched data circuits 30 for the respective terminals being served. Computer 28 translates commands from the user terminals and controls output displays at the user terminals. It also handles such routine functions as security, recovery of the system after a breakdown, archiving, and an additional function of maintaining a list of, e.g., start of message (SOM) pointers. Main computer 28 is able, additionally, to accommodate, for example, a text editing system to serve the terminals 10 independently of the voice message editing system to be herein described. Computer 28 also is able to handle some additional services such as those of the type considered in the aforementioned Anderson et al. application. In brief, the main computer advantageously has capabilities for multiuser access and for handling interprocess messages, as well as the mentioned text facilities, so that it can accommodate a general purpose time sharing sysytem. This permits extended flexibility in application of the editing system of the invention. For example, a user can call up a list of messages waiting for him and select one for playback without knowing in advance whether it will be played back in text form to his terminal screen or in audible form to his terminal audio transducer. In one illustrative embodiment of the invention, the main computer 28 was advantageously implemented with a Digital Equipment Corporation PDP 11/45 computer.

The VSS computer 29 operates as a peripheral device on the main computer 28 and provides communication between the switched voice connections of the subscribers and a bulk storage system, such as the VSS disc store 31. This computer was advantageously implemented in one embodiment by a Digital Equipment Corporation LSI 11/02 computer. In the schematic representation of the computer 29, a portion of its memory 32 is specifically shown within the schematic representation as including two parts 32A and 32B to facilitate description of the manner of the utilization of the DMA circuits 22 and 23. Thus, the illustrated memory portion 32 represents the portion of the memory area assiged for sole use by a specific one of the DMA circuits. That memory area is divided into two halves so that computer 29 can process digital voice samples in one half of the memory, while the DMA is loading digital voice samples from the switch 19 into the other half of the memory, or unloading such samples from that other half toward the switch 19, as the case may be, depending upon whether a recording operation or a playback operation is in effect. The disc store 31 advantageously is a type that allows different sectors of stored information to be read out in rapid sequence even though they are not actually stored in adjacent locations. One such store is the disc memory Model 94274 of the Control Data Corporation and a controller such as the Phoenix 45 controller of the Xylogics Corporation.

From the foregoing, it is apparent that the various system elements illustrated in FIG. 1 are all individually known in the art. Consequently, details of each and their interactions with one another are described here only to the extent necessary to illustrate how to make and use the invention.

Computer 29 is advantageously interrupt-driven. For example, it includes in its memory, in a portion not specifically shown in the drawing, plural sets of first-in, first-out (FIFO) registers assigned to respective priority levels. These register sets store pointers to tasks that currently are awaiting execution for interfacing the computer with the different pieces of associated hardware such as the DMA circuits, the disc store 31, the main computer 28, or particular functions to be performed within the computer 29 itself. Computer 29 recurrently scans the FIFOs for tasks by working from the highest priority FIFO to the lowest priority FIFO. When a hardware device or a computer function needs service, for example, if a user comes on line at a terminal 10, or actuates a key on the keyboard 13, or if a DMA completes operation on the loading or unloading of one of its half-memory blocks, an interrupt signal is sent to the computer 28 and registered in the appropriate FIFO register set. With this type of arrangement, the service is provided to each hardware device and computer function on the basis of a task module for that device or function. It is not necessary for the computer, when it changes from one task to another, which may be tasks for different user messages, to store the state of the whole computer system in order to be able to retrieve a return location as is often necessary in prior art operating systems for small computers, such as the computer 29.

A large general purpose computer could readily handle in real time all of the processing to be described herein for editing recorded voice messages for multiple users. However, for applications needing lower cost approaches, it is more convenient to use a smaller computer working as a special purpose machine. To this end, the indicated computer 29 is advantageously provided with a special purpose operating system in which general purpose capabilities not needed for the processes here described are discarded to increase the real time throughout. Likewise, to make good use of the FIFO registers already described, programs are advantageously segmented into tasks which are of convenient length to prevent undue blocking of any user message access to the computer and which end with as little information as possible being needed for retention to enable restart of message processing after an interruption. Thus, interrupts are allowed only at such task end points. Similarly, when a task is required that can consume substantial time for execution, but does not require the continuous control of the computer 29, e.g., a disc access, the operating system allows the computer to return to a FIFO scan to find other tasks and come back later when the access has been completed. These techniques are all well known in the art for time shared, special purpose computers and, as such, comprise no part of the present invention. They are outlined here merely to point out that the special purpose operating system approach is one way to enable a commercially available small computer to handle one or more users in a real time recorded voice message editing system.

In computer 29, operating system messages are generated in response to interrupts from the DMA, from the memory management system when new control sectors are required, and from a command interpreter program when commands are received from the main computer 28. These operating system messages provide the necessary sequencing communication among the various computer functions and cause various processes to be started. Each operating system message has an information part, a route part, and a part containing a list of parameters associated with the system message. The information part may contain, for example, a list of voice samples to be transferred between the computer memory and the disc store, or the information part may be empty.

The route part of an operating system message specifies the list of software functions that must be executed with respect to the information part, and it specifies the priority of each function. Those functions would be, for the same example, the ones needed to effect the indicated transfer. A route is assigned when the system message is first generated, but the route may be modified as the system message is processed, or by a particular function execution result in an earlier system message. For instance, if the system message information part includes the voice samples being recorded from the DMA, the route it normally passes through would, as will be considered in regard to FIG. 3, estimate the energy content of the speech segment samples, obtain a disc sector address from a list of available sectors, place that sector address number in a control sector for the recorded message, and transfer the received samples to the disc store. However, when a silent interval is detected, the route is modified because this voice message sample block does not require a disc sector for storage. Future voice message blocks, after detection of a first silent block, are routed through the energy computation function, and a function to increment a silent sector counter (to be described) until a nonsilent interval is detected. At that time, the route is modified so that a silent interval code and the run length count are stored, and the original path is followed by the nonsilent block and future voice message blocks.

The parameter list in the operating system message contains parameters for the various functions on a system message route, and those parameters provide a means for the various functions to communicate. For instance, in the previous example regarding transfer of voice samples into the disc store, the function which obtains the available disc storage sector address must convey this sector address number both to the function which maintains the list of storage sectors in the recorded voice message and to the function which writes the sample blocks provided from the computer memory to the disc.

The system contains a queue, i.e., a FIFO register set, corresponding to each priority that a function may have, and the computer basic operation is one of recurrently scanning the FIFO queues as hereinbefore outlined. Operating system messages waiting to access a particular hardware device are queued by corresponding pointers in the FIFO of a priority assigned to that device. When a system operation message is first generated, a pointer to that message and the currently required one of its functions is placed in a queue corresponding to the priority of that function in the route of the message. When execution of the function is completed, a message pointer to the next function of the route is placed in the queue required by the priority of that next function. This operation continues until all the functions on the route have been completed, and the operating system message leaves the system in the sense that no pointers to that particular message are queued. However, each time the VSS computer completes execution of a function, it does not necessarily take the next function of the same voice message or of the same system operation message. Rather, it examines the queues again, starting from the highest priority queue, until it finds a nonempty queue. It then executes the next function to be handled in that queue.

The queued functions requiring use of hardware devices are skipped if the corresponding device is busy when the queue of that priority is reached in a normal queue scan. This allows the hardware devices and the VSS computer 29 to operate simultaneously. For instance, if the disc is presently transferring data between the disc and the computer memory, the VSS computer will not examine the queue of the system messages which are to access the disc. Instead, it will determine if any lower priority functions are to be performed. When all the queues are empty, the computer continues examining the queues until a message appears due to one of the interrupt mechanisms.

The priorities of the queues reflect the importance of the operations to be performed and the real time constraints on those operations. The following table lists the seven priorities from one to seven in decreasing priority as employed in the illustrated embodiment of the invention:

Priority 1—Disc Input/Output requests (hardware)
Priority 2—Control of the memory management systems (to be described).
Priority 3—All functions after the first in an operating system message list to process voice samples being transferred between memory 32 and the DMA (real time voice processing).
Priority 4—First function in an operating system message list to process voice samples being transferred between memory 32 and the DMA (real time voice processing).
Priority 5—(Reserved).
Priority 6—Functions for operating system messages from the VSS computer 29 to the main computer 28 (hardware).
Priority 7—Operating system messages from main computer (commands), functions relating to returning sectors to the free-sector list, and all non-real time processing functions.

It can be seen that the disc commands the highest priority, and this is because it is the resource which limits the number of simultaneous users who can access the system. Accordingly, it is desirable to keep the disc busy as much of the time as possible.

In the priority 2 category are functions which may prevent other message related functions from being performed.

Each time a DMA interrupt occurs, a set of four blocks of voice samples are generated. It is desirable to have each of these sets of blocks as completely processed as possible before processing begins on the next, since one set may affect the route that sets following it take, and since the VSS computer memory 32 region occupied by the earlier set will be reused to the DMA before that which is occupied by later messages. Accordingly, operating system messages in this category are assigned priorities 3 and 4.

The priority 6 messages do not relate to the real time constraints imposed by voice sampling, so they are of lesser priority.

Finally, during the normal operation of the system, a command interpreter program for control messages from the main computer 28 and the functions related to restoring to the free-sector list sector addresses from a voice message being erased are examples of functions having least urgency and so commanding the lowest priority.

The commands hereinafter described are available to the user in one illustrative embodiment of the invention by employing the ASCII keyboard 13 of the terminal 10 to direct the main computer 28 in accordance with the commands. That computer, in turn, either responds to the command itself or orders the VSS computer 29 to take appropriate action. The overall system process starts by being responsive to the highest level commands when a terminal is first turned on, and these are the "message level" commands. Those commands then lead the system process to be responsive to "system commands" that must be selected by the user. Within each of these system commands are lower level functional process commands that are available.

The illustrative voice storage system advantageously operates in a command and interrogation mode of reaction between system and user, and which is known in the art. In this mode, a user command input, e.g., by way of the keyboard 13, stimulates a system response which includes an interrogation by the system of the user for further commands, the system inquiry appearing on the screen 12. Thus, when a user logs in on the terminal 10 by keying in his identification code and informing the system by similar key operations of the particular system service which is to be employed, e.g., the voice storage system with editing, the system advantageously responds with a display "Message Command" to invite further user input. Alternatively, of course, the system could automatically produce on screen 12 a display of the message level command options available to the user. The user would then make a selection by operating one of the buttons 16. Typical message level commands for the illustrative system are listed below with a designation of a key of keyboard 13 employed by the user to give the command and a brief description of the command:

n—create a new message (record)
1—list all recorded messages in user's system

\#—execute system commands on message number N (voice)

The foregoing commands put the system into a mode of operation wherein it is able to receive new speech signals for storage, or it is able to allow the user to select a previously stored message for retrieval.

The next order of commands is designated "system commands.38 These commands are available to a user who has selected a particular message for execution of system commands as indicated in the foregoing message level commands. These system commands place the system into an operating mode for executing commands to be employed by a user for editing a message and are as follows:

p—play back
    e—erase an entire user message
    i—insert into message
    d—delete part of message between specified pointers
    c—change part of message
    m—move part of message Now listed below are the foregoing system commands, together with the various lower order commands available to the user during the course of execution of each system command:

Play back
    g—get pointer
    p—pause (and remain at same command level)
    r—resume
    +—jump forward (5 seconds)
    — —jump backward (5 seconds)
    f—faster
    s—slower
    q—quit (and return to system command level)

The foregoing f and s commands each cause a change from the prevailing playback rate, and in the same playback direction, by a predetermined increment in a range of playback rates, which will be hereinafter described.

Record
    g—get pointer
    p—pause
    r—resume
    q—quit

Editing Commands
(All include the commands r, i, q, and p specifically hereinafter listed under only the "insert" command.)

Insert
    a—at-pointer
    s—newly recorded speech
    r—review change
    i—implement change
    q—quit
    p—display pointer Delete
    f—from-pointer
    t—to-pointer Change
    f—from-pointer
    t—to-pointer
    s—newly recorded speech Move
    f—from-pointer
    t—to-pointer
    a—at-pointer It will be observed in the foregoing lists that, in some instances, a single keyboard key is utilized for different commands. This represents no ambiguity in the operations, since the system automatically interprets the actuation of such a key in accordance with the command level of operation in which the system is running when a key is actuated.

There are hereinafter described in greater detail the processor 21 operations for some illustrative ones of the foregoing commands, as well as some low level interprocessor communication processes, and some application processes useful in editing voice messages. All of these processes are realizable by the foregoing commands.

Prior to describing these processes, however, it is useful for an understanding of the invention to outline an illustrative system which is advantageously employed for managing the memory space of the disc store 31. This management system is based upon a linked list technique. Other memory management systems could, of course, be utilized. It is convenient to consider the memory organization in terms of sectors, each sector being of a size which is adequate for the storage of a block of voice signal digital samples representing one-quarter of a VSS computer memory 32 half-region, e.g., 32A, which is scanned by a single DMA prior to its issuance of an interrupt request to the VSS computer 29. Thus, a sector represents one-eighth of the signal sample storage area in the memory 32 portion, which is assigned to a particular DMA. In the illustrative embodiment, such a sector advantageously includes 512 word locations. In the case of digital samples of a speech signal, such a sector represents approximately one-sixteenth of a second of the voice signal comprising an incoming message.

Figure 2:
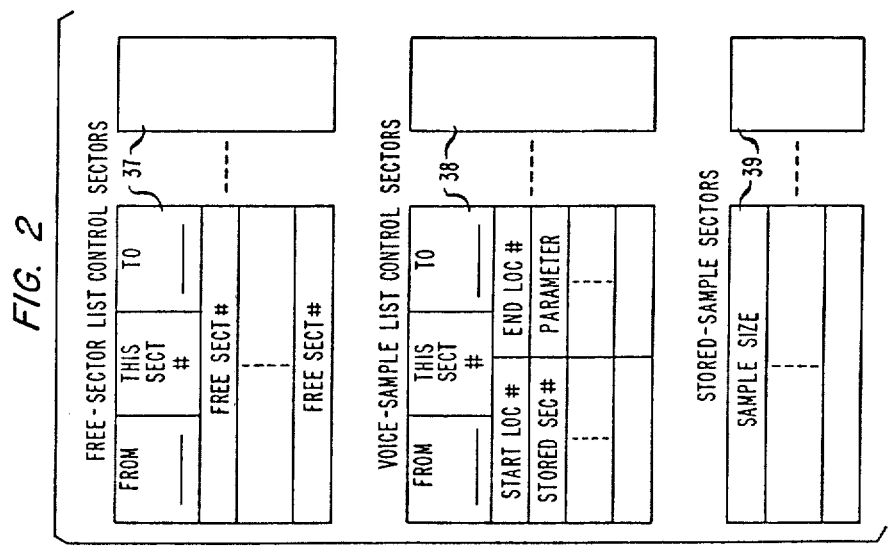
FIG. 2 is a schematic memory map illustrating a system for managing a disc memory utilized in the system of FIG. 1.

Three types of sectors used in store 31 are illustrated in FIG. 2; and an additional type, not illustrated, includes all free, i.e., unused, sectors in the disc store 31 which are available for use as one of the three types illustrated in FIG. 2. Those three types include free-sector list control sectors 37 and voice-sample list control sectors 38, which are utilized for storing addresses of sectors of other types. The third sector type in FIG. 2 is the stored-sample sector 39, which is utilized for the actual storage of digitally coded voice signal sample amplitudes.

Each of the control sectors includes, in an initial linking word location thereof, address bytes identifying the prior control sector "FROM . . . " in a message sequence of control sectors, the present sector, i.e., "THIS SECT #," and the address of the next following control sector "TO . . . ," in a message sequence of control sectors. In the free-sector control sectors, the word locations following the linking word include sector numbers, i.e., addresses in the disc store, of sectors which are available for use either as control sectors or for the storage of message samples. The contents of the different free-sector control sectors in the listed sequence are transferred to the VSS memory 32 as needed as a "shopping list" to be used by the VSS computer as a source of addresses in the disc store 31 for storage during recording operations. In addition, when a message is being totally or partially erased and stored-sample sectors or voice-sample control sectors become available, their addresses are written back into a location corresponding to a free-sector control sector. When enough have been accumulated, the control sector linking word is written with appropriate local and linking addresses, and the sector is placed back in the disc store at that local sector address.

In the voice-sample control sectors 38, a word location following the linking address location is utilized to define starting and ending locations within the control sector of the part of the sector locations actually utilized for voice message stored-sample sector addresses when less than all of the available sector word locations are employed. These start location numbers and end location numbers are sometimes hereinafter termed "displacement" to indicate as to them, or as to any other particular word location in the control sector, the sector number displacement from the linking word location. Other word locations in a voice-sample control sector each include two bytes. The first byte is sample amplitude information such as a stored-sample sector number where encoded sample amplitude data resides, and the second is a parameter which is a function of that information. In the illustrative editing system, the parameter value for a sample block with significant information is advantageously a signal energy level estimate, as will be hereinafter described. Such an estimate indicates an estimate of the average signal energy over the entire block of signal samples comprising a stored-sample sector. As will subsequently become apparent, the estimate is a convenient indicator of signal amplitude, energy, or power but is not a precise representation of any of them. Hence, the term "signal energy level estimate" is here used for convenience of description.

In the case of sample blocks which are determined to lack significant information, i.e., to represent silent intervals in the speech signal, the sample amplitude information byte includes a unique digitally coded character which is not a valid-stored sample sector number and, therefore, is a "silent code." The parameter byte, in this case, includes a digital character indicating the duration of the silent interval, i.e., a run-length code. When a message is being played back from disc store 31, the silent code is recognized in VSS computer 29, and the silent interval is processed, according to the playback rate function then in effect, prior to storage of the information in the VSS memory 32. Such rate functions include, for example, limiting all silent intervals to a predetermined length, reducing silent intervals to increase message playback speed, increasing silent intervals to reduce message playback speed, and setting silent intervals at a minimum predetermined length which is adequate to allow a user to recognize the interval and react by stopping playback for insertion of a pointer.

In the stored-sample sectors, there are no linking locations and no displacement indicating locations. Each word location includes a digitally coded sample magnitude word for the voice message signal. In order to read stored samples using a linked list technique, computer 29 reads a first control sector 38, then reads the samples from sector 39 addresses contained in its list, reads a second control sector 38 at the TO-address in the first sector, reads samples from the second sector list, and so on. The set of linked control sectors 38 for any one voice message is herein considered to be the memory management system for the message.

Figure 3:
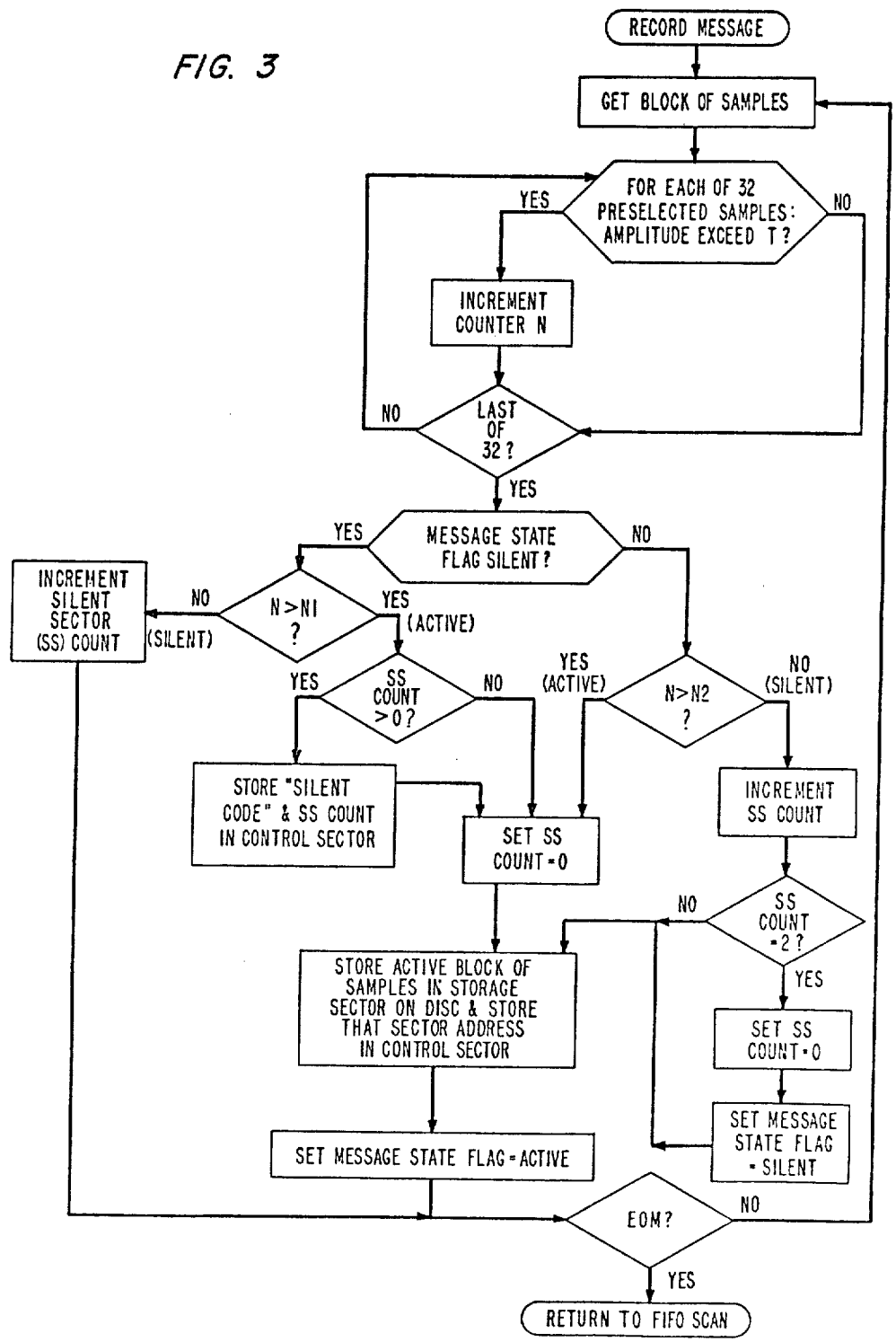
FIG. 3 is a process flow diagram for a RECORD MESSAGE process used in the system of FIG. 1.

FIG. 3 illustrates the process flow diagram for the process advantageously employed in the system of FIG. 1 for recording a message. This process is invoked by user actuation of the message level record command n. The VSS computer 29 processes digitally coded message samples that have been stored by a DMA into one-half of the VSS computer memory region 32 dedicated to that DMA. Initially, the computer gets the samples in sequence from its memory and, for each block of 512 samples (one-sixteenth of a second), computes a signal energy level estimate to obtain a number which is indicative of the energy represented by the samples of the block. The utility of that energy level indicator number will be apparent in the subsequent description of the RECORD MESSAGE process and in other processes which will be described.

It is not convenient, in the present state of the art, and using a microprocessor type computer such as computer 29, to obtain in real time a precise indication of the signal energy level for a block of voice signal samples because of the substantial computation time required to convert the $\mu$-law representation of signal samples to a linear format, square the sample values, and sum the squares as is necessary to obtain a mean square energy figure. To solve this real time problem, an approximation technique has been found to provide ample accuracy for the purposes to be described. It has been found that by comparing selected 82-law commanded signal samples in a sample-block time interval to a fixed threshold "T" level and counting the number of times that they exceed this level provides an adequate indication whether or not the interval contains significant information, i.e., whether it represents active voice or silence. In the illustrative embodiment using a 512-sample block, performing the comparison on 32 pseudo-randomly spaced samples provides a sufficient indication. The system is implemented by using any convenient technique to generate 32 pseudo-random numbers between 0 and 511 to select the 32 samples, and performing the comparisons on those same 32 samples for every sample block received. The number of times, N, that the threshold, T, is exceeded provides an indication of the energy level in the signal.

However, simply stating that all blocks with more than $N_t$ samples above the threshold are active, and those with less than $N_t$ are silent is not adequate. Depending upon N and T, either unvoiced sounds in the middle of words are interpreted as silent intervals, or some segments in prolonged silent intervals are interpreted as active. This situation is corrected by adopting a hysteretic rule requiring at least N1 of the samples to exceed the threshold to determine when the voice signal transfers from a silent to an active region and requiring that no more than N2 of the samples exceed the threshold to determine when the signal transfers from the active to a silent interval. By making N1 greater than N2, a larger signal is required to go back to an active interval once in a silent interval, the number of spurious active blocks in a silent interval is decreased, and the unvoiced sounds in the middle of words are retained.

In addition, however, the number N1 had to be made small enough that the beginnings of words were not lost, and N2 large enough that the beginnings of silent intervals were recognized. It was also found to be advantageous to prevent a signal in the active state from going into the silent state when the first silent interval is detected. The system requires L consecutive silent intervals before allowing the transition to a silent state. The parameters T, N1, N2, and L were found in the illustrative embodiment to provide a satisfactory percentage of silent intervals without clipping words or inserting silent intervals within words:

T——40 dbm
N1—8 out of 32
N2—4 out of 32
L—2

Returning to FIG. 3, the energy level estimate is effected for each block of samples by testing each of the selected 32 samples in the block with respect to the amplitude threshold T. If the sample exceeds the threshold, an energy counter N in the computer 29, but not specifically shown in FIG. 1, is incremented. When all of the 32 samples have been so tested, the value of N is the block energy parameter to be used for various purposes to be hereinafter described.

Next, the parameter N is tested with respect to the aforementioned values N1 (the threshold for transition from a silent to an active interval) and $N_2$ (the threshold for transition from an active interval to a silent interval). This testing determines whether to process the block on one of two different process branches, depending upon whether a message silent/active state flag for the immediately prior portion of the message was in a silent or an active state. (The illustrated process assumes that the system is initialized in the silent state.)

If the prior message state was silent, N for the current block is tested to see whether or not it is greater than N1. If it is not greater, the block is silent, a silent sector (SS) count is incremented. Thereafter, a test is made to determine whether or not the end of message (EOM) has been reached, e.g., by user actuation of the EOT ASCII key on keyboard 13. If the end of message has been reached, the VSS computer 29 returns to its FIFO scan mode and, if not, the process loops back to obtain the next block of digitally coded samples.

If N is greater than N1, the block is active, and the silent sector count SS is tested to determine whether or not it is greater than zero, i.e., whether or not at least the last prior block was silent. If greater than zero, the silent code and SS count (silent interval run-length code) are stored in the message voice-sample list control sector 38 currently being used. Thereafter, or if the SS count is not greater than zero, the SS count is set to zero; and the active block of samples is stored in the next available stored-sample sector 39 in disc memory 31, and the address of that sector is stored in the control sector 38, along with the parameter N for the block. Then a message state flag in the computer 29 is set to the active state, and the EOM test is made.

Returning to the decision point in the process at which the message active/silent state flag was tested, if the prior state was active, i.e., not silent, the current block energy level parameter N is tested to determine whether or not it is greater than N2. If greater, the current sample block is considered to be active; the silent sector count is set to zero; and the process passes to the aforementioned step in which the active sample amplitudes are stored in the disc store, and the corresponding sector address is stored in the current control sector. However, if N is not greater than N2, the current block is considered to be in the silent state, the SS count is incremented, and the resulting count is tested to determine whether or not it is equal to two. This test is necessary since it will be recalled that it is advantageously required that two sequential silent blocks must be detected after an active block before the message state will be considered to be silent. If the SS count is not equal to two, the process moves to the aforementioned step of storing the block of active samples. However, if the count is equal to two, the stored count value is set to zero; and the message state flag is set to indicate the silent state for the message. Thereafter, the process proceeds to the step for storing the active block of samples.

If during the RECORD MESSAGE process of FIG. 3 the user orders a different operation, such as GET POINTER or PAUSE, the operating system forces the appearance of an affirmative EOM test result. This allows completion of only the then-current process cycle, and causes the holding of the message state flag status and the memory management system address state, so the process can return to the FIFO scan to learn what is to happen next for the user message being processed.

Figure 4:
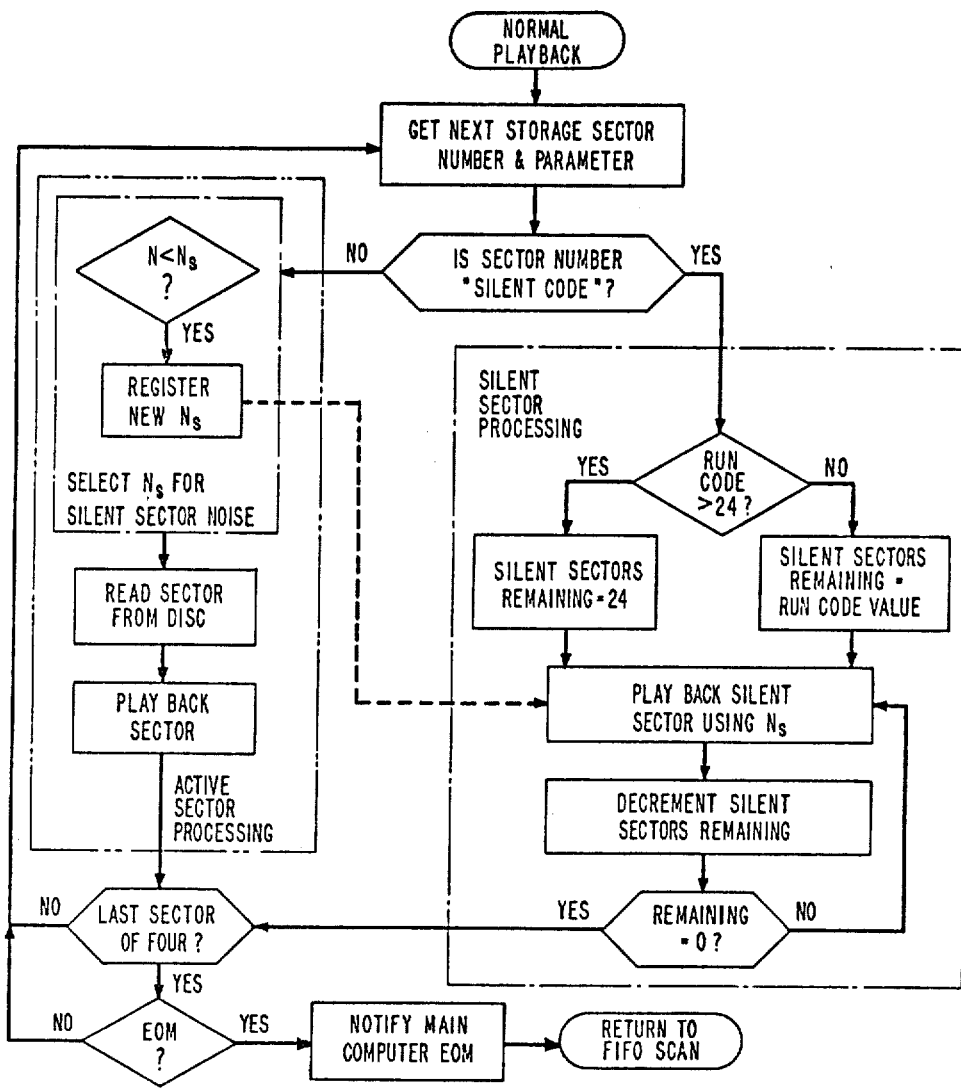
FIG. 4 is a NORMAL PLAYBACK process flow diagram for use in the invention.

FIG. 4 illustrates the process for NORMAL PLAYBACK, i.e., for the playing back of a message at a predetermined intermediate sample block rate from which the playback rate can be either increased or decreased by the appropriate user command. The normal playback process is initiated when a user actuates the p key of keyboard 13 after the system has indicated that it is in the system command mode by appropriate notice on the display screen 12. The system then obtains from the user by successive queries and responses the identification of a message which is to be played back. This identification is given by a message number in a sequence used exclusively for the particular user. The main computer 28 advantageously maintains a list of start of message (SOM) pointers and corresponding message numbers; and upon the user's indication of a particular message, the computer 28 selects the SOM pointer for that message and directs the VSS computer 29 to initialize its disc access circuits for the message memory management system starting at that pointer. That is, the computer 29 reads the control sector 38 address list for the indicated control sector into the computer 29 memory in preparation for the start of the playback routine.

The VSS computer 29 then gets the first, or next, as the case may be, storage sector 39 address and its parameter from the control sector list. The stored-sample sector number is tested to see whether or not it is, in fact, the silent code. If it is not the silent code, active sector processing is initiated.

The first step in active sector processing is to select the lowest value of N for use as a background noise sample value in silent sector processing to be described. In this selection, the current parameter N is compared in magnitude to any prior active sample value stored as a noise sample $N_s$. (The system is advantageously initialized with $N_s$ equal to approximately 0.5N2.) If the current value of N is less than or equal to the prior $N_s$, the current value is registered for future use. In either event, the process then continues by reading the stored sample sector from the disc store into the VSS computer memory region dedicated to the DMA of the user that is to receive the message.

In the preferred mode of operation, four sectors are prepared for transfer to the VSS memory and then transferred as a single four-block sequence. Thereafter, the message samples of each sector are played back from the memory 32, under control of the DMA, to the user's terminal. Upon completion of that sector playback, a test is made to determine whether or not the sector played back was the last sector of a set of four in the message. If the last sector has not occurred, the process loops back to get the next stored-sample sector and resumes processing. If the last sector is indicated, the VSS computer tests for end of message to determine whether or not the control sector 38 to-pointer is, in fact, an EOM code rather than the address of a further control sector 38. If not the end, the process loops to get a new sample sector; if it is the end, the main computer 28 is informed that EOM has occurred, and computer 29 returns to its FIFO scanning mode of operation.

At the silent code decision point, if it is determined that the silent code is present instead of a stored sample sector number, the process tests the run-length code associated with the silent code to determine whether or not it is greater than 24. This assumes that, in the normal playback process, the playback rate will be determined as a rate in which all silent intervals which are greater than 24 storage sectors, i.e., sample blocks, in duration will be limited to 24 sectors. Thus, if the run length code is greater than 24, a remaining-sector register in memory of computer 29 is set to the value 24 to indicate that 24 silent sectors remain in this silent interval. Thereafter, the first silent sector is played back to the user utilizing the aforementioned value $N_s$ as the sample value for each sample of the block. At the end of the block, the remaining-sector value is decremented and tested to determine whether or not it now equals zero. If it equals zero, the test for last sector is made. If it does not equal zero, the process loops back to play another silent sector utilizing the value $N_s$ again.

In the NORMAL PLAYBACK process, as in the RECORD MESSAGE process, the occurrence of a new user command before process completion causes the operating system to force an appearance of affirmative EOM test result so that the process can return to FIFO scan upon completion of processing of the current storage sector information.

Figure 5:
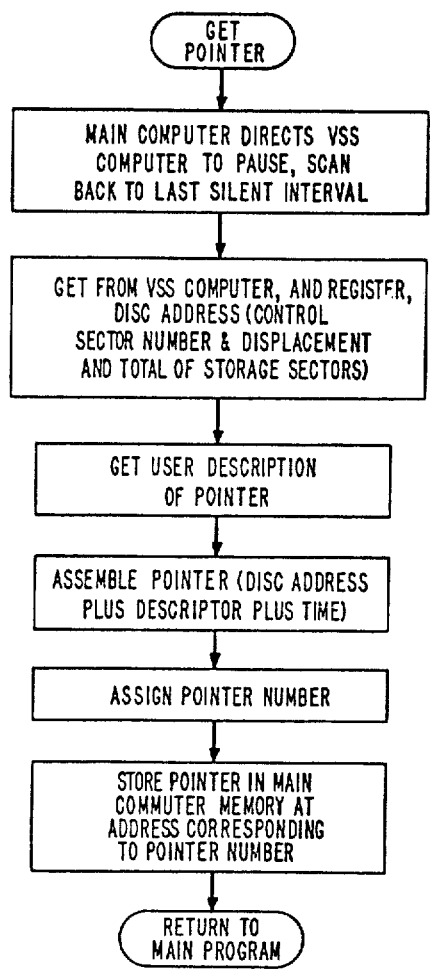
FIG. 5 is a GET POINTER process flow diagram for use in the invention.

FIG. 5 illustrates the system process for getting a pointer, that is, the operation in main computer 28 by which information is assembled to enable the main computer to collect in its memory a list of all pointers, their corresponding addresses in the disc store address sequence of the message, and any pointer descriptors provided by the user. This process can be initiated during either the playback or the record process by user actuation of the g key of keyboard 13. The operation is useful in the editing functions to be described. One purpose of getting a pointer is to identify a point in a message sequence which is of particular interest to the user. For example, a pointer advantageously identifies a point in the message at which some editing change may be directed. In addition, however, a user can advantageously employ a pointer list, to be described, as an outline of key points that the user wishes to remember in the message.

The GET-POINTER routine is initiated by user actuation of the "g" key during either playback or record. The main computer 28 directs the VSS computer 29 to pause, scan back over the most recently played back sectors 38 of the message being played back to the nearest silent interval of sufficient duration to permit pointer placement. This scan back accounts for delays, both in user response and in the system response, before halting during playback, which usually permit the play to proceed beyond the point at which the user first thought to place a pointer. The halting point may actually be in a silent interval, e.g., as in a record operation where the user generally stops speaking before calling for a pointer; and that silent time is the closest silent time, so no scan back actually takes place in that case.

Next, the main computer obtains from the VSS computer, and registers in the main computer memory, the disc store address of that silent interval, i.e., the control sector 38 number and the displacement in such sector, as well as the total number of stored-sample sectors in the message (the message time) up to that particular displacement. Main computer 28 now puts a statement on screen 12 inviting the user to indicate any description which is to be associated with the pointer. The total pointer, i.e., disc address plus time and descriptor is then assembled, assigned a pointer number, and stored in the main computer memory at an address corresponding to that pointer number. Main computer 28 then returns to its main program. Typically, in the course of such return, it signals the user by a message on display screen 12 that the system is ready for additional input from the user.

Figure 7:
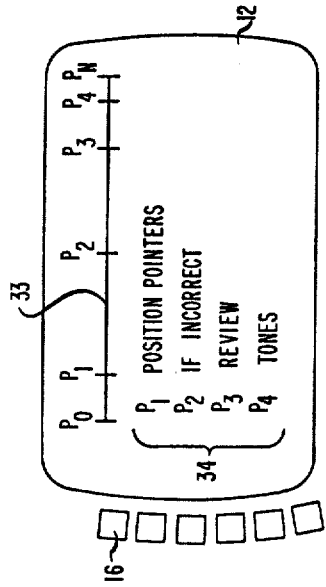
FIG. 7 is an illustrative pointer display.
Figure 6:
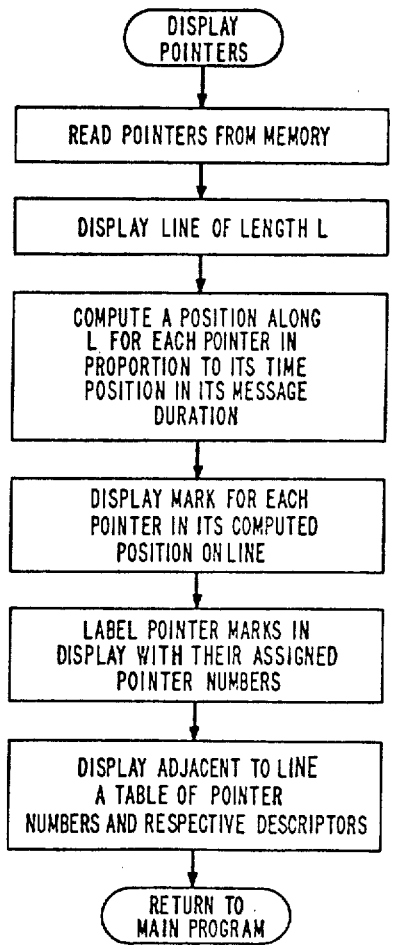
FIG. 6 is a DISPLAY POINTERS process flow diagram for use in the invention.

FIGS. 6 and 7 relate to the display on screen 12 of pointers associated with any particular message. The DISPLAY POINTERS routine in FIG. 6 is called when the user types the character p when the system is in the course of execution of any of either the message level or recording commands, or any of the system level commands. This routine is executed by the main computer 28 and puts up on the screen 12 a time line 33 and a pointer description list 34 as illustrated in FIG. 7. The line 33 has a length L which corresponds advantageously to the entire length in the time dimension of the recorded voice message identified by the user. At the lefthand end of the line, and automatically established by computer 28, a first pointer tic, $P_0$, indicates the SOM point; similarly, a pointer tic at the righthand end is designated $P_n$ and indicates the EOM point of the message. Distributed at various user-selected points along the line are additional pointers designated $P_1$, $P_2$, etc. at locations along the line which are proportional to the relative time position of the pointer in the overall message. The pointer list 34 includes all of the user-designated pointers, together with their respective descriptors provided by the user. Several illustrative descriptors are included in FIG. 7. In the course of directing editing operations, the user simply actuates one of the buttons 16 along the side of the display screen 12 to indicate to the system a particular one of the pointers. Alternatively, of course, the pointer list 34 can be omitted; in that case, the user simply types in the alphanumeric pointer designation appearing adjacent to the line 33 to make a pointer selection.

Returning to FIG. 6, the system responds to the actuation of the p key by having the main computer 28 read the message pointers from its memory and display them as illustrated in FIG. 7. In putting up that display, the main computer utilizes the time information represented by the total number of storage sectors contained in each pointer to compute coordinates in the display screen 12 for each pointer tic on line 33 in proportion to the pointer time position in the message. A tic mark is displayed for each pointer in its computed position on the time line. The tic marks are labeled with the pointer designation, and the list of pointers and descriptors is displayed adjacent to the time line 33. The main computer 28 then returns to its main program and signals the user by an appropriate message on screen 12 that the system is ready for additional appropriate inputting.

Figure 8:
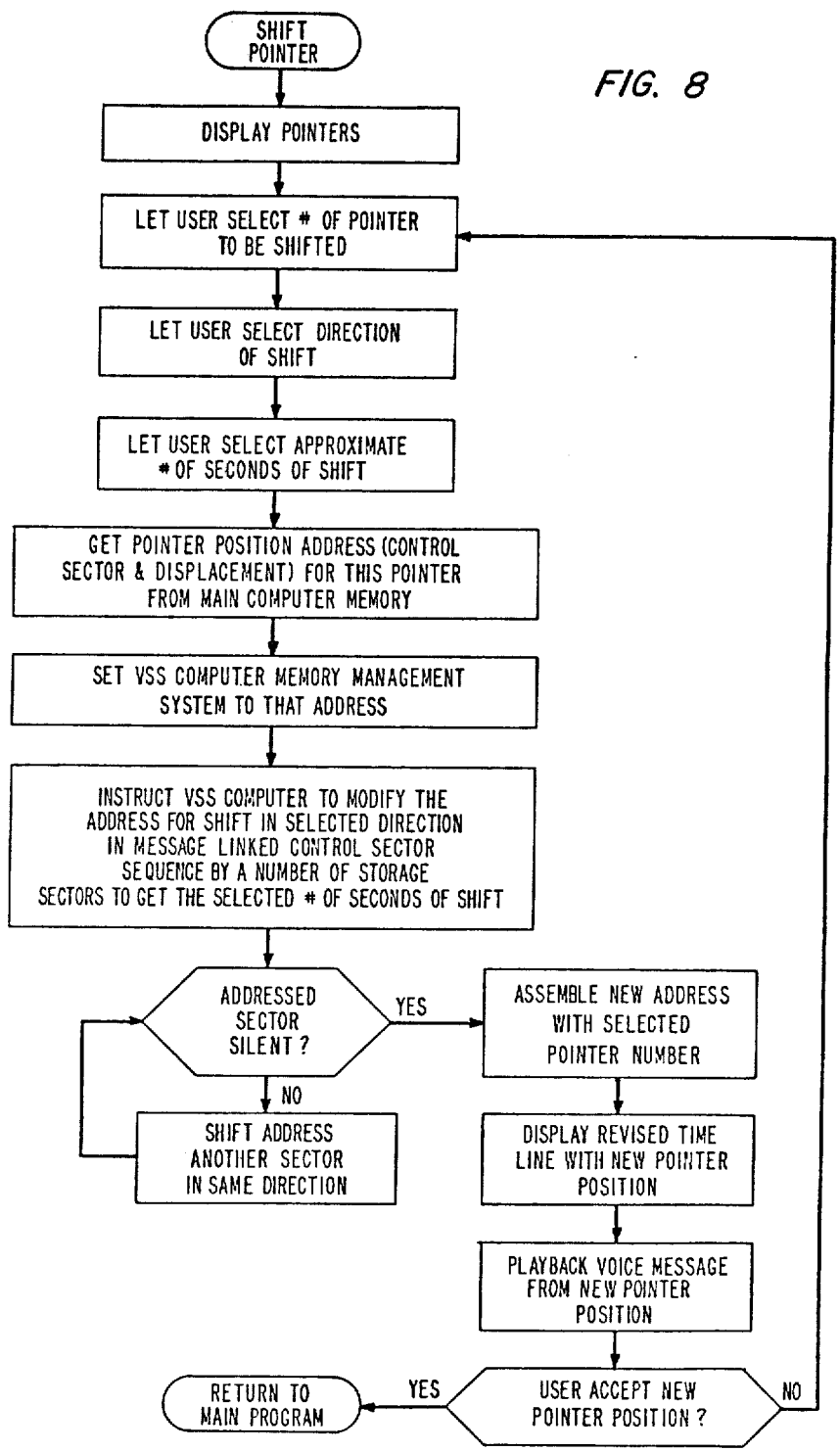
FIG. 8 is a process flow diagram for a SHIFT POINTER process for use in the invention.

FIG. 8 illustrates a SHIFT POINTER routine available in the illustrative system during any of the system level command executions and assuming, of course, that the user has already positioned one or more pointers as hereinbefore described. This routine is called by user actuation of the key m on the keyboard 13 when the system is in a system command execution mode. This actuation causes the main computer 28 to display the pointers as hereinbefore described and, additionally, to query the user to designate a particular pointer number, as well as the direction in which the selected pointer is to be shifted and the approximate number of seconds in the message by which the pointer is to be shifted. The main computer then obtains from its memory the disc store control sector 38 number and displacement for the selected pointer and directs the VSS computer 29 to set its memory management system to that address.

VSS computer 29 is then directed to modify the pointer address to correspond to the desired shift in the selected direction in the message linked control sector sequence by a number of stored sample sectors required to produce the selected number of seconds of shift at the normal playback rate regardless of what the current message playback rate may be. Now the VSS computer 28 tests the parameter of the addressed control sector location to determine whether or not the corresponding stored-sample sector is silent. If it is not silent, the VSS computer further shifts the address value by another word location in the same direction, i.e., a voice-sample control sector displacement reduced by one word location, and again tests the parameter in that sector in like manner. When a silent sector is found, the new control sector number and displacement are provided to main computer 28 which assembles the new address with the corresponding selected pointer number, registers the new pointer information by overwriting the old, and displays a revised time line with the new pointer position being shown.

Next, the main computer directs the VSS computer 29 to play back the voice message from the newly shifted pointer position. Thereafter, a test is made to determine whether or not the user accepts the new pointer position. If the user does accept the position, the main computer returns to its main program; if not, the SHIFT POINTER process loops back again to the level at which it allows the user to select the number of a pointer to be shifted.

It was previously mentioned that the illustrated system interfaces with the user through the terminal 10 by employing an interrogation and response technique. The table shown below illustrates one typical interaction sequence. This sequence is that which occurs for the FIG. 8 SHIFT POINTER process when called during the execution of a DELETE function. The events in the table are listed in time order of occurrence so the items in the system display column, and corresponding items in the user-typed response column, occur on different lines.

| SYSTEM DISPLAY MESSAGE | USER TYPED RESPONSE | EFFECT |
|---|---|---|
| System Command | d | Enter delete routine |
| Delete command | f | User wants pointer display so can select from-pointer |
| (Time line and pointer tables) Pointer # | | |
| | p | Desire to play back from a specified pointer |
| Pointer # | 1 | Plays back voice message from pointer 1 |
| Playback Command | q | Stops playback |
| Pointer # | m | User wants to move a pointer |
| Move pointer # | 1 | User wants to move pointer #1 |
| f or b | f | User wants to move forward in message |
| # of seconds | 2 | Computer 28 gives location of pointer |

-continued

| SYSTEM DISPLAY MESSAGE | USER TYPED RESPONSE | EFFECT |
|---|---|---|
| | | to VSS computer 29 which moves forward 2 seconds and then moves forward to silent sector, 28 gets sector location and associates with pointer, and 28 orders playback from new location |
| Playback Command | q | Stop playback |
| f or b | q | Don't move pointer further |
| Pointer # | 1 | System sets "from" pointer to 1 |
| Delete command | t | User wants to set "to" pointer |
| (Display pointer and time line) Pointer # | | |
| | 3 | Sets "to" pointer to 3 |
| Delete command | ? | User uncertain what to do next |
| (List possible delete commands) | r | Review delete command result--(Get temporary pointer 5 seconds before "from" pointer and 5 seconds after "to" pointer. Play back message between temporary pointers with tone burst substituted for deleted portion between "from" and "to" pointers.) |
| Delete Command | t | User wants to reset to-pointer |
| (Display pointer and time line) Pointer # | 4 | Set to-pointer to pointer 4 |
| Delete Command | r | Review with new to-pointer |
| Delete command | i | Implement change. (Divide message and join undeleted parts to implement this change.) |
| System Command | | |

All editing operations performed in the illustrative system include different combinations of functions in which pieces of a message are joined or divided. The message parts thus involved are identified by pointers inserted at silent intervals.

FIG. 9 illustrates the aforementioned JOIN process. JOIN is a main computer command to the VSS computer 29 that is used during editing in response, e.g., to an INSERT command to include a new message segment C in the voice-sample control sector 38 sequence between previously recorded message segments A and B. The process includes the identification of those two message segments A and B as previously identified by user-supplied pointers. The illustrated process assumes that the parts to be joined are represented by integral voice-sample control sectors.

Initially, the VSS computer 29 responds to the JOIN command by fetching the address (LA) of the last control sector of message segment A, and the address (FA) for the first control sector of new message segment C. Stated in different terms, LA is the control sector address and displacement of the pointer specified by the user in the underlying editing instruction, and FA is the control sector address obtained by the VSS computer at the beginning of the recording of the new speech provided by the user following a new speech "s" command. The LA address is stored in the FROM location of the initial control sector 38 in the new message segment C. Similiarly, the FA address of the new segment C is stored in the TO location of the linking word in the final control sector of the old message segment A. Thereafter, the VSS computer 29 reports to the main computer 28 that it has completed the required JOIN operation. For the mentioned illustrative INSERT command, a similar JOIN operation must be ordered and executed to join segments C and B.

FIG. 10 illustrates the VSS computer 20 process for the DIVIDE operation. This process is used to open up an existing message into message segments A and B in preparation for, e.g., an INSERT operation. The illustrated DIVIDE process is needed when the pointer identifying the point at which an editing function is to be executed is at an intermediate displacement between the first and last sector address word locations of a control sector. This process splits the message at the pointer and inserts a new control sector to list all of the stored-sample sector addresses from the pointed control sector and following the pointer in the message sequence. In the process, the new control sector is joined to precede in the message sequence the old control sector that had followed the pointed control sector. Then the pointed sector contents following the pointer are transferred to the new sector, and the pointed sector TO address is erased. Now the VSS computer reports completion to the main computer 28. The new sector is not at this point joined to the pointed sector because some editing function specified by the user is to be performed with respect to the message sequence break left in the control sectors at the pointer.

FIG. 11 illustrates the system level DELETE command which is called by user actuation of the d key of the keyboard. In order to simplify the description, details of the system-user interchange such as were described in regard to FIG. 8 are omitted in FIGS. 11 and 12. This operation causes the removal of material from the disc store and from the computer memory, as well as deleting it from a previously recorded message sequence. The ERASE operation is to be distinguished from the DELETE operation because in the former, it is necessary to transfer all storage sector numbers listed between start of message and end of message pointers to the free-sector list, but in the DELETE operation, additional operations must be carried out. In the DELETE process, the main computer 28 obtains from the user the starting and ending pointers for the segment which is to be deleted. It then verifies that those pointers occur in the corresponding message sequence order by comparing the respective sector number totals (message times) in the pointer address information. Thereafter, the message is divided into separate segments at each pointer, and the stored-sample sector addresses of the sectors between the control sector pointers are transferred to the free-sector list. Then the remaining original message parts are joined, and the main computer 29 returns to its main program.

FIG. 12 illustrates the INSERT process which is a system level operation initiated by actuation of the i key of the keyboard 13 to add a message segment to a previously recorded message sequence at a location identified by a user-provided pointer. The new message segment is recorded in previously free stored-sample sectors, the addresses of which are listed in at least one new control sector. Next, the main computer 28 directs the VSS computer 29 to divide the original message at the specified pointer and, thereafter, join the new message segment control sectors to the original message control sectors at the division. Thus, the initial control sector of the new segment is joined to the final control sector of the old segment prior in the message sequence to the division pointer by corresponding changes in linking addresses. Similarly, the new segment final control sector is joined to the initial control sector of the original message segment following the division pointer.

In a voice storage system, it is useful to remove extensive silent intervals in order to conserve storage space in the bulk storage medium. This type of operation, i.e., the use of silent and run-length codes, has already been discussed in connection with the RECORD MESSAGE process of FIG. 3. Controlling silent intervals is also useful for facilitating the placement of pointers. In addition, it is useful to control message playback speed in order to avoid user boredom and to facilitate the scanning of a message or a group of messages. The speed control arrangements of the present invention achieve the desired results without correspondingly changing the disc store access rate, and without correspondingly changing the user perceived speech frequency level. The method utilized is to control the duration of silent intervals and, to a limited extent, to delete certain active sample blocks as will be described in connection with FIG. 13.

Initially, however, the illustrative embodiment includes seven different playback speed levels, R1 through R7, which are selectable by the user. Each speed level involves certain disc store sector readout treatments which are predetermined for the system. These speed levels and a characterization of the message sector treatments are listed below:

R1—multiply number of silent sectors by 8.
R2—multiply number of silent sectors by 4.
R3—multiply number of silent sectors by 2.
R4—(editing speed)—set number of remaining silent sectors to 16.
R5—normal playback.
R6—eliminate silent intervals except those longer than 16 sectors, and limit those longer intervals to 2 sectors.
R7—speed level R6 plus elimination of selected active sample sectors.

If a user types the f command during the playback operation, the playback rate will be increased by one level for each such actuation. Similarly, if the user types the s command, the playback rate is decreased by one level for each such key actuation.

When the main computer 28 issues a new playback command to the VSS computer 29, the command contains parameters to indicate the maximum number of silent sectors to be allowed in any silent interval, the number of silent sectors below which the number of silent sectors is set to zero, a multiplier for silent sectors, and a flag bit to indicate whether or not active sectors are to be eliminated. These parameters are specified by the main computer in consideration of the number and sequence of user speed control commands given by the user after any particular message playback has begun. The normal playback rate is that which results from the process illustrated in FIG. 4.

Slower playback rates are achieved by certain modifications of the FIG. 4 playback process in the silent sector processing branch thereof. To achieve the rate R3, the run code test and the immediately following functions for setting the number of remaining silent sectors are deleted from the process. In substitution, therefore, the number represented by the run length code of the indicated silent interval is multiplied by 2, and the product registered for determining the duration of the sectors-remaining interval for playing back silent sectors. A similar change is effected to realize either the rate R2 or the rate R1, except that the multipliers used are 4 and 8, respectively.

In order to achieve the editing rate, R4, the silent sector processing is modified from that shown in FIG. 4 by deleting the same process portions previously deleted for rates R1-R3 and substituting therefor a step in which the number of silent sectors remaining is set to 16. This causes all silent intervals to be one second long and thereby allows a user a sufficient opportunity, upon detecting such an interval, to order a pause so the user can then decide whether or not to create a pointer in that position in the message.

Rate increases are accomplished in either one or two steps for rates above the normal rate. The first increase is effected the first time that the user strikes the f key when the system is already operating at the normal rate. This causes a change in the FIG. 4 silent sector processing in that the run-length code of a silent interval is tested to determine whether or not it is greater than 16 (rather than 24 as in the normal mode). If it is, the number of silent sectors remaining is set to 2, and if not, the number of silent sectors is set to zero.

The second rate increase is implemented on the second successive actuation of the f key when the system is operating at the normal rate. In this situation, the first rate increase changes in the process will have been effected by the first actuation of the f key. Now, on the second actuation, the process is further changed to eliminate up to half of the active sample blocks based upon a block parameter N calculation which is done before reading a sample block from the disc store 31. Thus, the increase in playback rate is realized without a corresponding increase in the number of disc accesses.

It has been found that if (a) only those intervals with less energy than the short term average energy are eliminated, and (b) no more than one interval is eliminated in succession, a reasonably intelligible rendition of the message results. In the current implementation, the previously discussed energy level estimate number N stored with each stored-sample sector address is used also for active sector elimination. For this purpose, during the processing of the control sector word for each $i^{th}$ active sample block interval, the moving average value $E_i$ of N for active sectors up to that sector interval is calculated as:

$$E_i = a E_{i-1} + (1-a) N_{i-1}$$

where $$0 > a \leq 1.$$

The average tracks changes in signal level more quickly at smaller values of "a" than at larger values, but some listeners consider the playback to be too distorted when the average was tracking quickly. A value of $\frac{1}{8}$ was found to work well in the illustration. If the number $N_{i-1}$ is less than $E_{i-1}$, the sector sample block interval is a candidate for removal, and will be removed if the previous interval has not been removed. $N_{i-1}$ is then used to modify the moving average in the calculation of $E_i$.

This rate conversion technique is also speaker dependent. In most instances, it results in a rate increase between two and three times, so that a message that takes one minute to record can be played back in between twenty and thirty seconds. The messages resulting from this technique contain noticeable distortion, but they are intelligible. The messages usually have the characteristic that those words which the speaker considered to be most important and so had spoken louder are virtually undistorted, whereas those words that were spoken softly are shortened. This type of rate conversion is useful for scanning a large number of messages to determine which should be listened to more carefully, or for scanning a long message to locate a segment to be edited.

Figure 13:
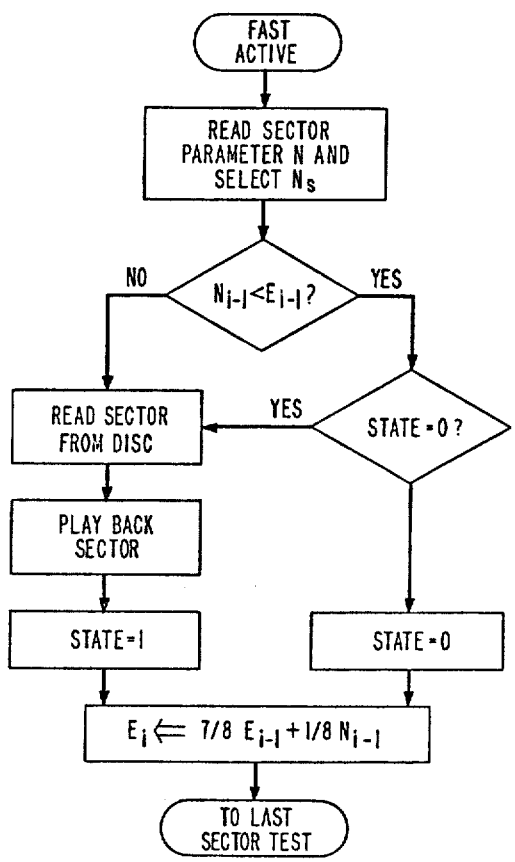
FIG. 13 is a process flow diagram for a FAST ACTIVE process for use in the invention.

FIG. 13 illustrates the modification of the active sector processing portion of the normal playback process of FIG. 4 which is necessary to determine which active sectors will be eliminated in a playback at the rate R7. After reading the sector parameter N from memory and selecting the value $N_s$, the process tests the value of N to determine whether or not it is less than the moving average value E of that parameter N computed through the prior active sector $N_{i-1}$. The system is initialized with a value of E equal to zero. If the test reveals that $N_{i-1}$ is not less than $E_{i-1}$, it is assumed that the sector under consideration contains a block of samples which is not a candidate for elimination. Consequently, that sector is read from the disc store, played back to the user, and a signal state flag is set to binary ONE to indicate that an active sector has just been played. Thereafter, a new value of E is computed as the sum of seven-eighths of the prior value $E_{i-1}$, plus one-eighth of the value of $N_{i-1}$. Following this computation, the process executes the FIG. 4 last-sector test.

However, if the value of $N_{i-1}$ had been less than or equal to $E_{i-1}$, it would be assumed that this sector is a candidate for elimination. Consequently, the message state flag is tested to see whether or not it is equal to binary ZERO. If it is, the prior sector was eliminated, and the current sector under consideration must be read from the disc store and played back. However, if the flag state is not equal to ZERO, it means that the prior active sector was played back; consequently, the current sector is not played back, the signal state flag is set equal to binary ZERO, and a new value of $E_i$ is computed.

Although the present invention has been described in connection with particular applications thereof, it is to be understood that additional embodiments, applications, and modifications, which will be obvious to those skilled in the art, are included in the spirit and scope of the invention.

I claim:

1. A method for recording and editing digitally coded signal sample amplitude information, said method comprising the steps of defining in a train of coded samples successive discrete blocks of samples, computing for each of a plurality of said blocks a signal parameter that is a function of said information for such a block of samples, storing in retrievable association sample amplitude information and said parameter for such information, and processing said sample amplitude information for editing in accordance with the respective associated parameters.

2. The method in accordance with claim 1 in which said storing step includes the further steps of testing said parameter for each of said blocks to determine whether it is an active block containing significant useful information or a silent block lacking significant useful information, storing each active block of samples in association with a parameter being its signal energy approximation, and storing for each sequence of silent blocks, including at least one block, a common silent-amplitude code in association with a parameter being a run-length code indicating the number of silent blocks in the sequence.

3. The method in accordance with claim 2 in which said processing step includes the further steps of testing said amplitude information to distinguish between active and silent blocks, and setting signal readout speed by controlling the duration of silent block sequence intervals.

4. The method in accordance with claim 3 in which said speed setting step includes the steps of testing the magnitude of said run-length code with respect to a predetermined maximum duration threshold, and limiting all codes greater than said threshold to that threshold value.

5. The method in accordance with claim 3 in which said speed setting step includes the steps of testing the magnitude of said run-length code with respect to a predetermined minimum duration threshold, and extending all smaller silent intervals to a duration equal to that threshold.

6. The method in accordance with claim 3 in which said speed setting step includes the step of extending all silent intervals to a duration greater than said run-length code by a predetermined factor.

7. The method in accordance with claim 3 in which said speed setting step includes the step of reducing the duration of all silent intervals to zero duration.

8. The method in accordance with claim 7 in which said processing step includes the further steps of testing the magnitude of said signal energy approximation for each active block against a moving average of approximations including those for prior active blocks, bypassing for readout any active block having an approximation less than said average and as to which the most recent prior active block in the sample information sequence was not bypassed, and computing a new value for said average including the approximation of the block just tested.

9. The method in accordance with claim 3 and including the further steps of comparing said approximation of each new active block with a stored approximation of a prior active block having the lowest approximation of all prior active blocks of a common message information sequence, overwriting said stored lowest approximation with the new block approximation if it is the lower of the two compared approximations, and in said processing step, reading out the current value of said lowest approximation as the sample amplitude information for each sample of a silent block.

10. The method in accordance with claim 1 and including the further steps of producing at least one pointer at a corresponding number of selectable places in a sequence of said sample information, each pointer including at least an address from said storing step for sample amplitude information corresponding to the selected place in the sequence of such pointer, storing said pointers, and providing, at selectable times in the information of a message sequence, and separately from the information readout, indications in human-perceptible form of the relative positions in said sequence of the stored pointers.

11. The method in accordance with claim 10 in which said pointer producing step includes the step of forcing said pointer sample information address to be an address for at least one sample block lacking significant useful information.

12. The method in accordance with claim 10 in which said information represents speech signals and said pointer producing step includes the step of producing as a part of any selectable pointer a textual descriptor identifying the information subject matter adjacent to said place for such pointer, and said indication providing step includes the steps displaying a time line having a length that is representative of the length of a stored message comprising said information sequence, the display of said line including therealong reference marks identifying the pointers produced in said message in their respective relative positions in said message, and displaying adjacent to said time line a list of said pointer reference marks and their respective descriptors.

13. The method in accordance with claim 12 in which there are included the further steps of shifting the position of a selectable one of said pointers by a given distance and in a given direction in a stored message sequence, and testing said information at the shifted pointer position to determine whether or not it lacks significant useful information, and if not so lacking, to automatically shift the pointer location further in the same direction until an address is found that is so lacking.

14. The method in accordance with claim 13 in which a user provides signals indicating the given distance and direction and there are included the further steps of playing back to the user the information readout in the processing step, repeating said time line displaying step with the shifted pointer reference indicator being shifted to show the new position of the pointer, and inviting said user to direct any required repetition of said shifting, testing, playing back, and line display repeating steps for the selected pointer with new distance and direction specifications.

15. The method in accordance with claim 10 in which said processing step includes the step of editing the stored sample amplitude information.

16. The method in accordance with claim 15 in which said editing step includes the step of modifying the number of sample blocks in the information to eliminate selectable ones of the blocks not required to convey human-intelligible information.

17. The method in accordance with claim 15 in which said editing step includes the step of modifying the sequence of stored samples by executing additions and/or deletions in the sample sequence as to parts of said information therein defined by a selectable one or more of said pointers.

18. The method in accordance with claim 17 in which said modifying step includes the step of providing on user command a reviewing playback of a portion of said stored sample sequence as modified and which includes sequence portions extending beyond the modified portion by a predetermined amount, the playback including a burst of audible tone at the location of each pointer used to define said modified portion.

19. The method in accordance with claim 17 in which said storing step employs a linked list technique for accessing stored blocks of said samples and said modifying step includes the further step of altering addresses linking lists of addresses of stored sample blocks.

20. In a voice storage system for user supplied messages and having input/output connections for digitally coded voice signal samples and data character signals, data processing means for controlling said system, and means coupled to said processing means for accomplishing bulk storage of messages represented by at least said voice signals, the improvement comprising in said processing means means, responsive to a user supplied pointer request data signal, for registering in the processing means a pointer indicating the address in said bulk storage means corresponding to the point in a recorded message sequence at which such pointer request was received, means for providing in human-perceptible form and independently of said message sequence indications of the relative positions in said message sequence of any pointers registered for at least a portion of said voice samples, and means, responsive to a command in further data signals and referencing at least one of said pointers, for making an editing change in a portion of said recorded message sequence identified by such one or more pointers.

21. The system in accordance with claim 20 in which said input/output connections include at least two free-running direct memory access circuits for defining predetermined sized blocks of said voice signal samples of a message, and said processing means includes means for processing a set of a single defined one of said blocks for each of said access circuits into said bulk storage means in no more time than is required by one of said access circuits to define one of said blocks.

22. The system in accordance with claim 20 in which said input/output connections for said voice and data signals are separate, said messages are supplied in either voice signal form or data character form, said bulk storage means includes means for storing voice signal sample messages and means for storing data character messages, said processing means includes means operable in a recording mode for directing voice message samples and data message characters to their respective storing means in said bulk storage means, said processing means includes means operable in a playback mode for withdrawing said messages from their respective storing means and steering such messages to output connections appropriate to the message form.

23. The system in accordance with claim 20 in which said registering means comprises means for serially numbering said pointers, means for appending a user supplied descriptor to a pointer number, means for appending to said descriptor a message sequence address corresponding to the sequence position at which the user requested the pointer, and means for storing pointers, each including said descriptor and sequence address, in said processing means, the message sequence address being the address of a digital word representing an interval of no significant message information at, or adjacent in the message sequence to, the pointer request point.

24. In a system for recording and playing back voice messages by coupling through a data processor cooperating with a bulk storage unit, the system including means for receiving from a user both voice messages to be recorded and data commands to said processor, the method for editing a recorded voice message in response to said commands and comprising the steps of receiving a user command to establish a pointer referring to a user-selected point in said recorded message, generating a pointer including at least a digital indication of the address of a storage location at least adjacent to said selected point in said bulk storage unit, storing said pointer in said processor, and modifying said recorded message in a part designated by said pointer.

25. The method in accordance with claim 24 comprising in addition the step of presenting in human-perceptible form, and independently of playback of said message, indications of the relative positions in said recorded message of any pointers stored in said processor.

26. The method in accordance with claim 24 comprising in addition the steps of receiving a user command to shift a designated pointer in a specified direction and by a specified time interval in the sequence of said recorded message, modifying said address of said designated pointer in said direction and by an amount corresponding at least to said interval, and playing back said recorded message from said address as modified.

27. The method in accordance with claim 26 and comprising in addition the step of presenting in human-perceptible form indications of the relative position in said recorded message of said designated pointer, as shifted.

28. The method in accordance with claim 26 in which said address modifying step includes the substeps of
  altering said address of said designated pointer by an amount corresponding to said direction and said interval,
    testing a portion of said recorded message at said address as altered to determine whether or not said portion is at least a part of a low-energy interval having an energy level below a level predetermined to be too low to convey significant useful information, and if not a low-energy interval,
    further altering said address of said designated pointer in the same direction in steps of predetermined size and similarly testing a recorded message portion at each step until a low-energy portion is detected, and
  said step for playing back does so from the altered address used for detecting said low-energy portion.

29. The method in accordance with claim 28 comprising in addition the step of
  repeating at least one time said receiving step with a newly specified pointer displacement, said address modifying step, and said playback step.

30. A method for storing signal information represented by digitally coded signal samples, said method comprising the steps of
  computing a signal energy level estimate for each successive block of said samples, each block being of a common predetermined size, said estimate being an indicator of the information activity level represented by information in a block of samples,
  storing in retrievable association at least predetermined ones of said blocks of samples and their respective energy level estimates, and
  editing said information, stored in said storing step, in editing operations based upon a predetermined amplitude threshold of said energy level estimates.

31. The method in accordance with claim 30 in which said editing step comprises an editing operation including the substeps of
  retrieving from storage at least a portion of said information that was stored in the storing step, and
  limiting information intervals having a signal energy level estimate less than a predetermined level to a predetermined maximum time duration for controlling the retrieval speed.

32. The method in accordance with claim 31 in which said editing step comprises an editing operation including the further substep of
  deleting selectable information intervals having a signal energy level estimate greater than or equal to said predetermined level and less than a further predetermined level for increasing said retrieval speed, the last-mentioned intervals being selected, and said further predetermined level being selected, to achieve a predetermined compromise between retrieval speed and information intelligibility.

33. The method in accordance with claim 30 in which said editing step comprises an editing operation including the substeps of
  establishing at least one pointer to a storage address a of said signal information stored in said storing step, said address representing a location in said information having a signal energy level estimate below a predetermined level, and
  modifying a portion of said information identified by said at least one pointer.

34. A method for storing signal information represented by digitally coded signal samples, said method comprising the steps of
  computing a signal energy level estimate for each successive block of said samples, each block being of a common predetermined size, and
  storing in retrievable association at least predetermined ones of said blocks of samples and their respective energy level estimates,
  said storing step including the substeps of
    detecting low-energy blocks of samples having energy level estimates sufficiently low to preclude the presence of substantial human useful information in the block, and
    registering for low energy blocks both a unique code indicating a low-energy interval and a run-length code indicating the number of successive low-energy blocks in the interval.

35. The method in accordance with claim 34 in which said registering substep includes the further substeps of
  indicating as to each block whether or not it is a low-energy block, and
  storing the information of respective blocks according to a hysteretic rule by which each new block is tested with respect to one of two different energy level estimate thresholds, N1 and N2, depending upon the prior energy level state of the message, N1 being greater than N2, such that
    if the prior message state was a low-energy state and the new tested block estimate is greater than N1, the new block is designated active, but if the new block estimate is not greater than N1, the new block is designated low-energy, and
    if the prior message state was an active state and the new tested block estimate is the second of plural blocks that are not greater than N2, the new block is designated low-energy, but if the new block estimate is greater than N2, the new block is designated active.

36. A method for editing recorded digitally coded signal information in a recorded information sequence not visible to a human user and including active intervals of significant signal level information and relatively inactive intervals lacking significant signal level information, said method comprising the steps of
  establishing at least one record address pointer to a selectable inactive interval location, not visible to a user, in the recorded information sequence,
  establishing a unique reference designation for any established pointer and by which an editor can call such pointer, for at least partially defining a position in said sequence,
  translating a called pointer designation to produce the record address of the selectable location, and
  editing said recorded information with reference to at least one established pointer designation.

* * * * *

UNITED STATES PATENT AND TRADEMARK OFFICE
CERTIFICATE OF CORRECTION

PATENT NO. : 4,375,083
DATED : February 22, 1983
INVENTOR(S) : Nicholas F. Maxemchuk It is certified that error appears in the above—identified patent and that said Letters Patent is hereby corrected as shown below:

In the Specification, column 8, line 17, "to" should read --by--. Column 9, line 8, "38" should read --"--. Column 10, line 45, "..."" should read --___"--; line 48, "...,"" should read --___,--. Column 19, line 4, "Similiarly" should read --Similarly--; line 12, "20" should read --29--. Column 21, line 59, "O>a≤1." should read --O<a<1.--. Column 24, line 14, "of" should read --for--; line 32, after the word "steps" insert --of--.

Signed and Sealed this

Sixteenth Day of April 1985

[SEAL]

Attest:

DONALD J. QUIGG

*Attesting Officer*  *Acting Commissioner of Patents and Trademarks*